April 15, 1930.                W. H. STOVER                  1,755,085
                        AGRICULTURAL IMPLEMENT
                          Filed Dec. 1, 1926            2 Sheets-Sheet 1
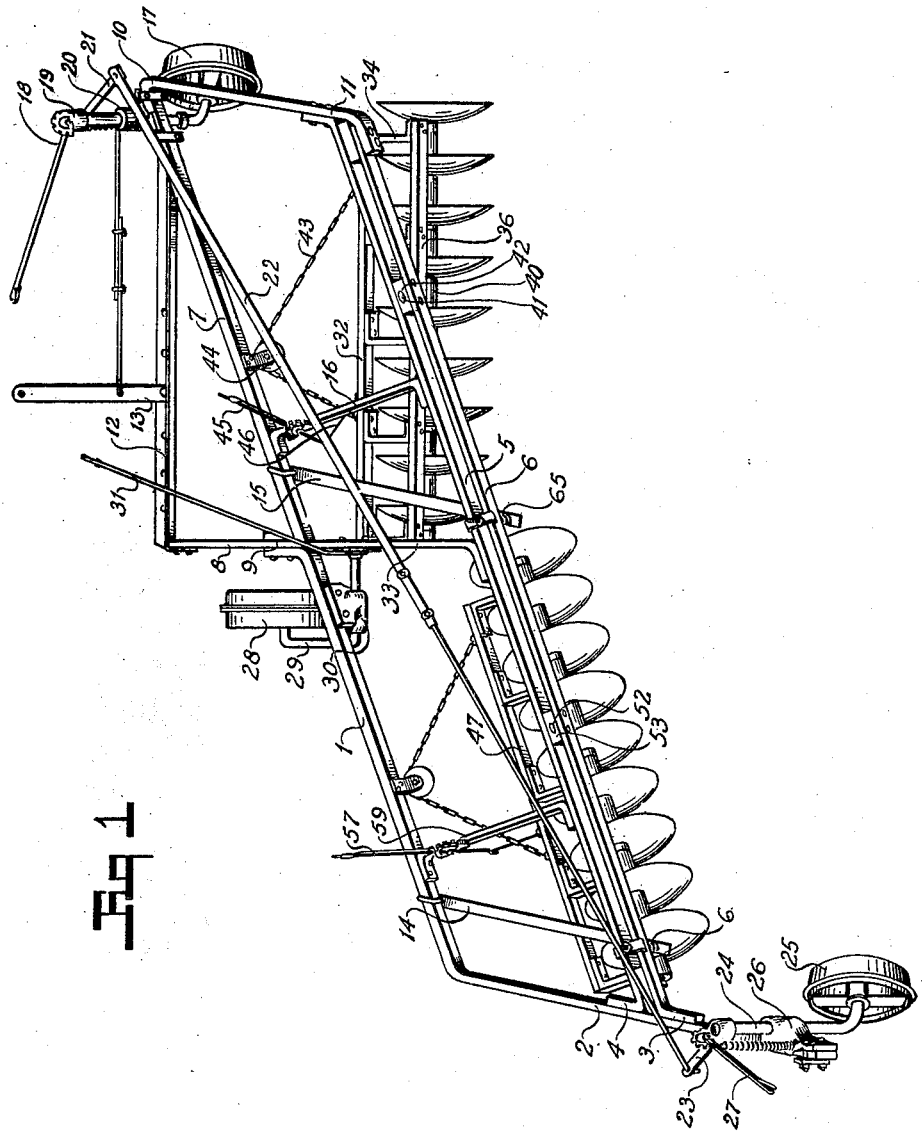
Wm H. Stover
INVENTOR
BY
B. F. Funk ATTORNEY April 15, 1930.  W. H. STOVER  1,755,085
AGRICULTURAL IMPLEMENT
Filed Dec. 1, 1926    2 Sheets-Sheet 2
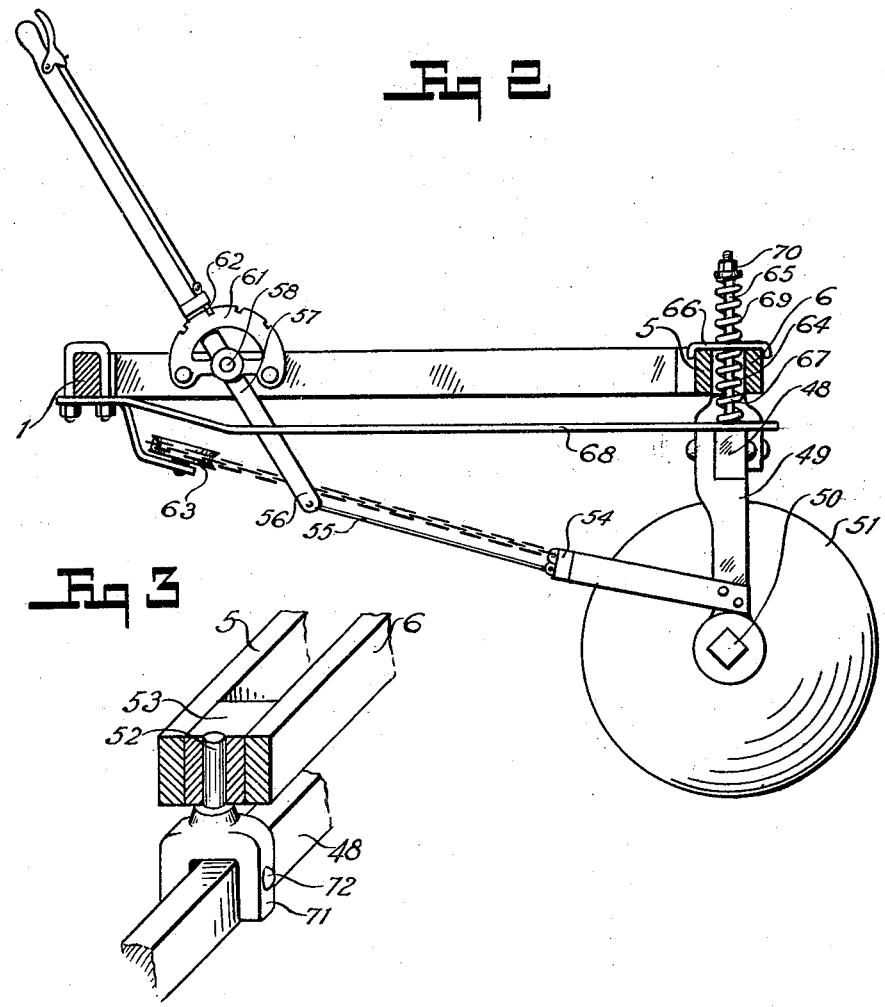

Patented Apr. 15, 1930

1,755,085

UNITED STATES PATENT OFFICE

WILLIAM H. STOVER, OF COLWICH, KANSAS

AGRICULTURAL IMPLEMENT

Application filed December 1, 1926. Serial No. 151,896.

This invention relates to a one-way disc plow and a one-way disc harrow and packer.

In preparing a seed bed the farmer ordinarily plows the field, then discs it, then packs and finally harrows. My invention contemplates an agricultural implement which will plow the ground, harrow and pack it so that the bed is prepared for the seed by the same implement. This eliminates the necessity for having a separate implement for each operation, resulting in considerable saving to the farmer. Generically, the invention contemplates independent disc gangs, independently pivoted to a frame or frames with all discs facing in the same direction. Each gang is adapted to be adjusted to one angular extreme for plowing, the opposite angular extreme for packing and to an intermediate position to harrow. Each gang is flexibly connected to its frame both horizontally and vertically, to render the implement flexible as it passes over the ground.

In order to appreciate the novelty, as well as the advantages, of my invention reference should be had to the following description in connection with the accompanying drawings in which:

Fig. 1 is a rear-perspective view of an agricultural implement constructed in accordance with my invention, the front disc gang being in packing position and the rear disc gang being in plowing position, the gangs being capable of being adjusted to position between the two extremes for harrowing.

Fig. 2 is a cross-sectional view through the frame showing the springs for permitting flexible up and down movement for the disc gang and Fig. 3 is a fragmentary perspective view of the frame bar and one of the gang bars with pivotal connection between them.

In carrying out the invention I provide a relatively rigid draft-frame consisting of appropriate bars to support the draft or pull-rigging and a bar to which the gangs are flexibly attached.

The bar 1 is shown as arranged diagonally of the frame. It has rearwardly extending end portions 2 fastened to the ends 3 and 4 of the two members 5 and 6 which constitute the slotted bar structure at the rear of the frame. A diagonal bar 7 in line with the bar 1 parallel with the bars 5 and 6 is fastened at one end to a transverse bar 8, also connected to the bar 1 at 9 with its other end connected to a cross-bar 10, fastened to the bar members 5 and 6 at the point indicated at 11. The forward end of the bar 8 carries a longitudinal bar 12 also fastened to the member 10. The member 12 carries a pull-rod or draft-rigging 13. The bar 1 and the bar 7 may be fastened to the slot bar structure consisting of the members 5 and 6 by cross-tie bars 16. There is an adjustable furrow wheel 17 carried by the frame, the furrow wheel being adapted to be raised and lowered by a lever 18 connected to the spindle 19 in the bearing 20. The furrow wheel is carried by the spindle. The spindle carries an arm 21 to which is fastened a flexible link 22 connected to the arm 23 on the spindle 24 carrying the rear wheel 25 so that both wheels 17 and 25 can be swung in unison through the medium of the link 13' and draw-bar 13. The spindle 24 is mounted in a bearing 26, carried by the end 2 of the bar 1. The spindle 24 may be adjusted vertically by the lever 27. The frame carries a land wheel 28 on a shaft 29 in bearing 30. The land wheel has a ratchet lever 31 fastened to the shaft 29 so that it may be raised and lowered. The particular construction of the frame and the dispositions of the wheels 17, 25 and 28 may be varied. So the specific details of construction are not of great importance, the principal features of the invention being the mounting of the disc gangs for the purposes above specified.

I have shown two disc gangs, the first consisting of a frame bar 32 with rearwardly extending ends 33 and 34 and a rear bar 36 parallel with the bar 32, the bars 32 and 36 being connected by tie-bars 37. The rear bar 36 carries brackets 38 in which is mounted a shaft 39 having spacing sleeves 40 between which concavo-convex discs are mounted. The concavities of all the discs face in the same direction. The rear bar 36 is provided with a pivot 41 mounted in a block 42 in the slot between the bar members 5 and 6 so that the gang may be swung horizontally about the axis of the pivot 41. There is a chain 43 fastened, at its ends, to the bar 32. This chain passes around a pulley 44 carried by the bar 7. A ratchet lever 45 on bar 16 is connected to the frame bar 32 by a link 46. Therefore, when the lever 45 is operated, the disc gang can be swung angularly to either of two extreme positions or to an intermediate position.

The rear disc gang is constructed substantially like the front disc gang, the discs being carried by a similar frame which I will designate 47. The rear bar 48 carries brackets 49 in which is mounted a shaft 50. This shaft carries discs 51 spaced apart by spacing sleeves. The rear bar has a pivot 52 in a block 53 in the slot between the members 5 and 6. The forward bar 44 of the gang frame has a link 55 connected to the end 56 of the lever 57, pivoted at 58 to the bar 59 of the main frame. There is a rigid segmental rack 60 on the bar 59 so that the spaces between the teeth 61 may be engaged by the pawl 62 of the ratchet lever 57 in a well understood manner. The disc frame may be swung about its pivot by the lever 57, there being an equalizing chain fastened at its ends to the bar 54 and passing around a pulley 63, carried by the bar 1. Near the ends of the respective frames 32 and 47 are vertical equalizing devices 64 and 65, one of these being best shown in Fig. 2. The equalizing devices each consist of an upstanding pin 65 passing through a bridge plate 66, bridging the slot between the members 5 and 6. There is an expansion spring 67 between the plate 66 and the yielding cross-bar 68 which carries the pin 65, resting on the rear bar 48, tending to press the bar 68 downwardly, but a counter-acting spring 69 of like structure is coiled about the pin 65, one end bearing upon the bridge plate 66 and the other against the nut 70, tending to raise the bar 68, so that the springs equalize one another but allow a certain amount of flexibility for the frame. The gang frames ride against the bars 68. In order to permit flexibility, the pivot 52 has a yoke-shaped lower end 71 in which the bar 48 is received, the bar being fastened to the yoke by a pivot 72, so that the bar 48 may swing in a vertical plane and the pivoting pin 52 may swing about a vertical axis.

From the foregoing it will be apparent that the disc gangs are adjustable horizontally and at least one of the disc gangs is adjustable both vertically and horizontally.

In Fig. 1 I have shown the forward set of discs in packing position and the rear in plowing position. Ordinarily, however, both gangs will be at the same angle during the travel over the field, but it is obvious that the single implement may be used for plowing, harrowing and packing.

What I claim and desire to secure by Letters-Patents is:—

1. A combined plow, discer and packer comprising a rigid frame, supplemental frames independently pivoted to the first named frame, at least one of the supplemental frames being mounted so as to rock vertically, separate sets of concave discs carried by the supplemental frames, all the discs facing in the same direction, and means for independently swinging the supplemental frames in horizontal planes so that one set of discs may be at one angle while the other set of discs are at a different angle.

2. A combined plow, discer and packer comprising a rigid frame, supplemental frames independently pivoted to the first named frame, at least one of the supplemental frames being mounted so as to rock vertically, separate sets of concave discs carried by the supplemental frames, all the discs facing in the same direction and means for independently swinging the supplemental frames in horizontal planes so that one set of discs may be at one angle while the other set of discs are at a different angle, the frames having such movement that the discs can be swung into plowing position, discing position or packing position whereby the discs can either plow, disc or pack.

In testimony whereof I affix my signature.

WILLIAM H. STOVER.